United States Patent
Joh et al.

(10) Patent No.: US 9,628,617 B2
(45) Date of Patent: Apr. 18, 2017

(54) METHOD AND APPARATUS FOR CONTROLLING OUTGOING CALL IN VEHICLE EQUIPPED WITH VOICE RECOGNITION FUNCTION

(71) Applicant: HYUNDAI MOTOR COMPANY, Seoul (KR)

(72) Inventors: Jae Min Joh, Yongin-si (KR); Kyu Seop Bang, Yongin-Si (KR); Soon Kwon Paik, Yongin-si (KR); Kyung Chul Lee, Hwaseong-si (KR); Woo Young Kwak, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/548,280

(22) Filed: Nov. 19, 2014

(65) Prior Publication Data

US 2016/0014273 A1    Jan. 14, 2016

(30) Foreign Application Priority Data

Jul. 11, 2014    (KR) ........................ 10-2014-0087687

(51) Int. Cl.
*H04B 1/38*    (2015.01)
*H04M 3/42*    (2006.01)
(Continued)

(52) U.S. Cl.
CPC ..... *H04M 3/42178* (2013.01); *B60R 16/0373* (2013.01); *G10L 15/22* (2013.01);
(Continued)

(58) Field of Classification Search
CPC ............ H04M 2250/74; H04M 1/6041; G10L 15/265
See application file for complete search history.

(56) References Cited

U.S. PATENT DOCUMENTS

2005/0135573 A1*  6/2005  Harwood ............ H04M 1/6091
                                                                  379/88.03
2009/0011799 A1*  1/2009  Douthitt .............. H04M 1/6091
                                                                  455/569.1
(Continued)

FOREIGN PATENT DOCUMENTS

JP    2008-527859 A    7/2008
JP    2012-093422 A    5/2012
(Continued)

OTHER PUBLICATIONS

Office Action issued in Korean Patent Application No. 10-2014-0087687 dated May 26, 2015.

*Primary Examiner* — Mohammed Rachedine
(74) *Attorney, Agent, or Firm* — McDermott Will & Emery LLP

(57) ABSTRACT

An outgoing call control method for an in-vehicle head unit equipped with a voice recognition function includes connecting Bluetooth communication with a user device when a vehicle is powered on. Whether or not an existing voice recognition database is present is checked. Phone book information is downloaded from the user device through the connected Bluetooth communication. Voice recognition for an outgoing call is performed using the existing voice recognition database during download of the phone book information if the existing voice recognition database is present.

9 Claims, 4 Drawing Sheets

(51) Int. Cl.
  *G10L 17/00*   (2013.01)
  *G10L 25/54*   (2013.01)
  *H04M 1/725*   (2006.01)
  *B60R 16/037*  (2006.01)
  *G10L 15/22*   (2006.01)
  *G10L 15/28*   (2013.01)
  *H04M 1/27*    (2006.01)
  *H04M 1/60*    (2006.01)

(52) U.S. Cl.
  CPC .............. *G10L 15/28* (2013.01); *G10L 17/00* (2013.01); *G10L 25/54* (2013.01); *H04M 1/271* (2013.01); *H04M 1/6091* (2013.01); *H04M 1/7253* (2013.01); *H04M 3/42153* (2013.01); *G10L 2015/228* (2013.01); *H04M 2201/40* (2013.01); *H04M 2250/02* (2013.01)

(56) References Cited

U.S. PATENT DOCUMENTS

| | | | |
|---|---|---|---|
| 2009/0280746 A1* | 11/2009 | Sykora | H04M 1/274516 455/41.3 |
| 2011/0184730 A1 | 7/2011 | LeBeau et al. | |
| 2012/0183221 A1* | 7/2012 | Alasry | G10L 15/06 382/181 |

FOREIGN PATENT DOCUMENTS

| | | |
|---|---|---|
| KR | 10-2003-0090863 A | 12/2003 |
| KR | 10-2013-0011464 A | 1/2013 |
| KR | 10-2013-0138431 A | 12/2013 |

\* cited by examiner

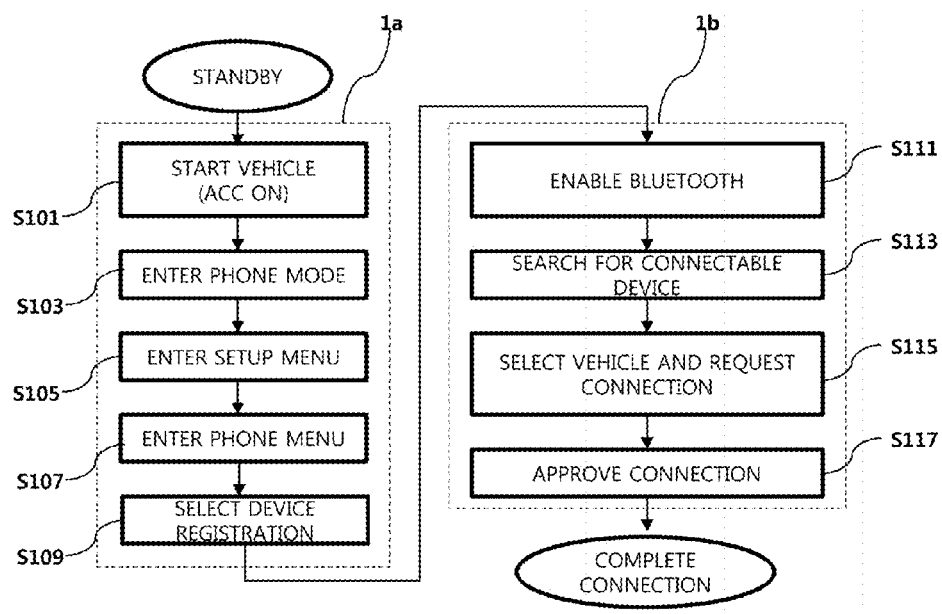
FIG. 1 — Prior Art —
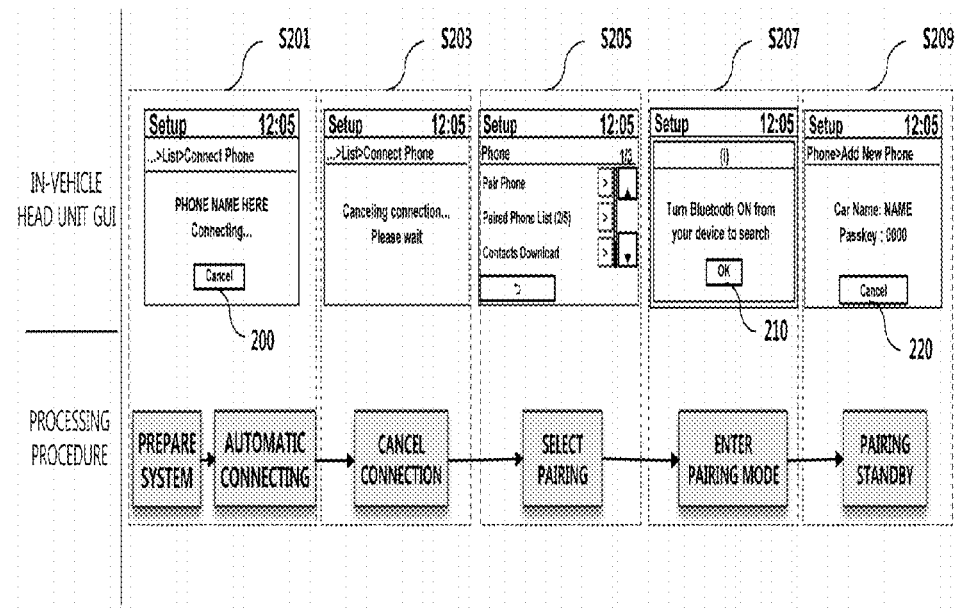
FIG. 2 — Prior Art —

METHOD AND APPARATUS FOR CONTROLLING OUTGOING CALL IN VEHICLE EQUIPPED WITH VOICE RECOGNITION FUNCTION

CROSS-REFERENCE TO RELATED APPLICATION

This application claims the benefit of priority to Korean Patent Application No. 10-2014-0087687, filed on Jul. 11, 2014, which is hereby incorporated by reference in its entirety.

TECHNICAL FIELD

The present disclosure relates to a method of controlling an outgoing call in a vehicle equipped with a voice recognition function and an apparatus for performing the same.

BACKGROUND

Recent rapid development of information technology (IT) has a great influence on the vehicle industry. Various IT technologies are involved in vehicles.

Particularly, a vehicle pairing technology interlocked with a communication device, such as a smartphone, to provide various services is in the spotlight.

When a vehicle starts, a Bluetooth function of an in-vehicle head unit having a Bluetooth hands-free function is automatically enabled, and as a result, the in-vehicle head unit enters a pairing standby mode. At this time, a driver performs a pairing operation through selection of a predetermined menu in the in-vehicle head unit and the smartphone. When the pairing operation is completed, the driver may have a telephone conversation in a Bluetooth hands-free state.

In order to receive a conversation service in the vehicle using Bluetooth pairing, phone book information and call history information stored in a paired mobile device must be transmitted to the in-vehicle head unit.

A user may perform an outgoing call using the received phone book and a voice recognition means equipped in the in-vehicle head unit.

However, the outgoing call is not performed normally during reception of the phone book information and the call history information from the paired mobile device, or in a case in which the phone book information is not present in the in-vehicle head unit.

In addition, the outgoing call through voice recognition may be limited during creation of a voice recognition database after transmission of the phone book information to the in-vehicle head unit is completed.

SUMMARY

The present disclosure is directed to a method and apparatus for controlling an outgoing call in a vehicle equipped with a voice recognition function that substantially obviate one or more problems due to limitations and disadvantages of the related art.

An aspect of the present inventive concept provides an outgoing call control method in a vehicle equipped with a voice recognition function and an apparatus for performing the same.

Another aspect of the present inventive concept provides an outgoing call control method for an in-vehicle head unit that is capable of performing voice recognition based on an existing voice recognition database when phone book information received from a Bluetooth-paired mobile device is not present or while a phone book and a call history are being received through Bluetooth pairing, thereby preventing generation of an incorrect guide message and malfunction.

Yet another aspect of the present inventive concept provides an outgoing call control method for an in-vehicle head unit that is capable of performing voice recognition based on an existing voice recognition database even during creation of a new voice recognition database based on phone book information received from a mobile device, thereby preventing generation of an incorrect guide message and malfunction.

Still another aspect of the present inventive concept provides an outgoing call control method for an in-vehicle head unit that is capable of using a stored dummy voice recognition database in an interlocked state when an existing voice recognition database is not present during download of a phone book, thereby preventing repeated generation of a voice recognition error.

A further aspect of the present inventive concept provides an outgoing call control method for an in-vehicle head unit that is capable of displaying a correct guide message for a situation even when a call-related command contained in a dummy database is input.

Additional advantages, objects, and features, of the inventive concept will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present disclosure provides a method and apparatus for controlling an outgoing call in an in-vehicle head unit equipped with a voice recognition function.

According to an exemplary embodiment of the present inventive concept, an outgoing call control method for an in-vehicle head unit equipped with a voice recognition function includes connecting Bluetooth communication with a user device when a vehicle is powered on. Whether or not an existing voice recognition database is present is checked. Phone book information is downloaded from the user device through the connected Bluetooth communication. Voice recognition for an outgoing call is performed using the existing voice recognition database during download of the phone book information if the existing voice recognition database is present.

The voice recognition for the outgoing call may be performed using a dummy voice recognition database if the existing voice recognition database is not present.

A notification message indicating that available phone book information is not present in the in-vehicle head unit may be output when a user's input voice is recognized using the dummy voice recognition database.

The notification message may be output using at least one selected from between a popup notification window and a voice.

The dummy voice recognition database may be created using dummy phone book information comprising frequently used names and a dummy phone book may not contain telephone number information corresponding to the names.

The number of the names contained in the dummy voice recognition database may be decided based on a defined voice recognition rate.

A confidence value used by a voice recognition engine of the in-vehicle head unit may be adjusted based on the decided number of the names and the defined voice recognition rate.

The number of the names contained in the dummy voice recognition database may be decided based on a defined voice recognition response time.

The dummy voice recognition database may be created and retained based on dummy phone book information pre-created based on a country or local area.

The in-vehicle head unit may be interlocked with an in-vehicle global positioning system (GPS) module and the dummy voice recognition database corresponding to a current location of the in-vehicle head unit may be used in the voice recognition for the outgoing call.

The existing voice recognition database may be retained in the in-vehicle head unit in response to the user device before download of the phone book information.

Whether existing phone book information is identical to the phone book information which is being downloaded is checked. The voice recognition for the outgoing call may be performed using the existing voice recognition database if the existing phone book information is identical to the phone book information. The existing phone book information corresponding to the existing voice recognition database may be retained.

When the existing phone book information is not identical to the phone book information which is being downloaded, a new voice recognition database may be created using the phone book information which is being downloaded and the voice recognition for the outgoing call may be performed using the created new voice recognition database.

A computer readable medium contains a program for executing the outgoing call control method in an aspect of the disclosure.

According to another exemplary embodiment of the present inventive concept, an in-vehicle head unit performs an outgoing call through voice recognition, in which the in-vehicle head unit communicating with a user device. The in-vehicle head unit includes a Bluetooth module configured to perform Bluetooth communication with the user device. An in-vehicle communication module is configured to communicate with an electronic control unit (ECU) of a vehicle. A signal detection module is configured to detect a received signal strength indicator (RSSI) and to measure a strength of the detected signal. A controller is configured to apply power to the in-vehicle head unit and to commence an automatic pairing procedure. A memory is configured to store programs for operating the controller and to temporarily store input/output data. A power supply is configured to supply power to operate the in-vehicle head unit.

It is to be understood that both the foregoing general description and the following detailed description of the present inventive concept are exemplary and explanatory, and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment/s/ of the inventive concept and together with the description serve to explain the principle of the invention.

FIG. 1 is a view illustrating a conventional in-vehicle Bluetooth pairing procedure.

FIG. 2 is a view illustrating a user interface screen output to an in-vehicle head unit during the conventional Bluetooth pairing procedure.

DETAILED DESCRIPTION

Figure 3:
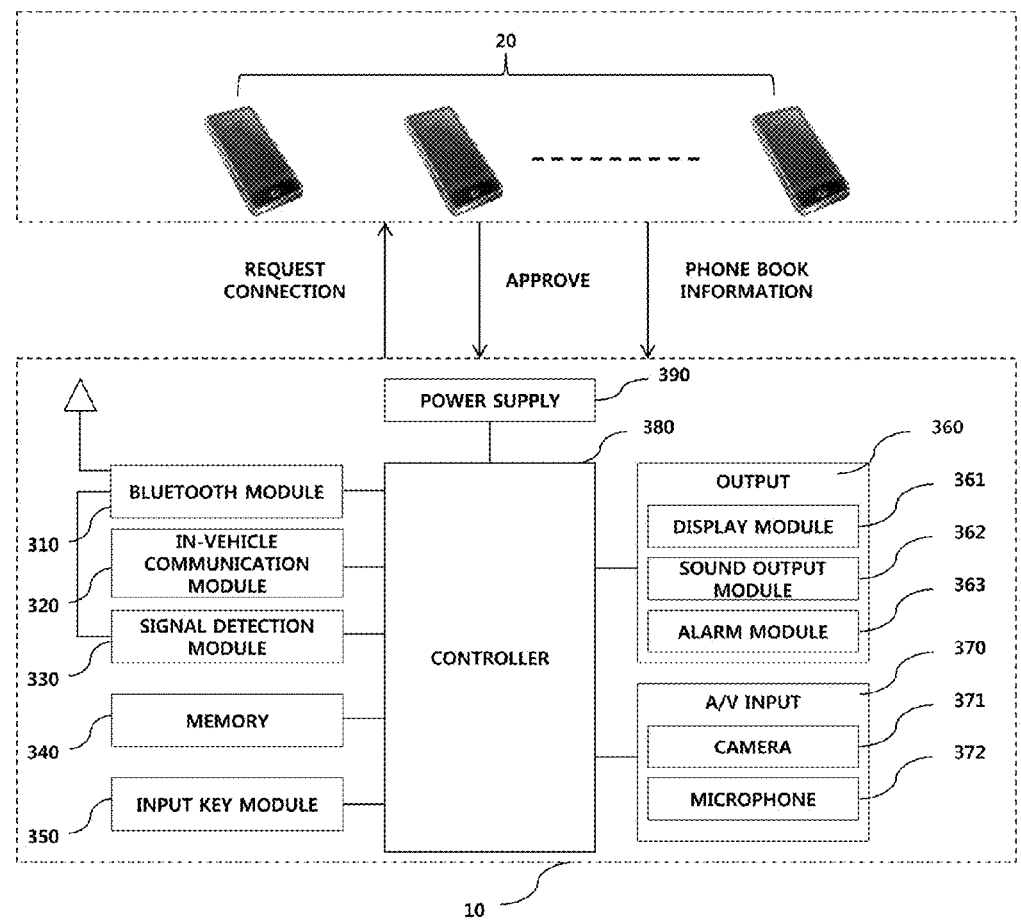
FIG. 3 is a view showing a configuration of an in-vehicle hands-free conversation system in which an in-vehicle head unit is connected to a user device according to an embodiment of the present inventive concept.

Reference will now be made in detail to the embodiments of the present disclosure, examples of which are illustrated in the accompanying drawings. The terms "module" and "unit" of elements herein are used for convenience of description and thus can be used interchangeably and do not have any distinguishable meanings or functions.

Although all elements constituting the embodiments of the present disclosure are described so as to be integrated into a single one or to be operated as a single one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present disclosure pertains. The computer program may be stored in a computer readable media such that the computer program is read and executed by a computer to implement embodiments of the present invention. Computer program storage media may include magnetic recording media, optical recording media, and carrier wave media.

The term "comprises," "includes," or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present invention, such terms are not interpreted as ideal or excessively formal meanings.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to," or "accessed by" another element, one element may be "connected to," "coupled to," or "accessed by" another element via a further element although one element may be directly connected to or directly accessed by another element.

Hereinafter, a conventional in-vehicle Bluetooth pairing procedure will be described in brief with reference to FIGS. 1 and 2.

FIG. 1 is a view illustrating a conventional in-vehicle Bluetooth pairing procedure.

Reference numeral 1a denotes a Bluetooth pairing procedure performed in an in-vehicle head unit and reference numeral 1b denotes a Bluetooth pairing procedure performed in a user device.

Referring to reference numeral 1a, when a user starts a vehicle, and therefore, the vehicle is powered on (i.e. ACC ON) and a vehicle system is prepared, an in-vehicle head unit (H/U) starts an automatic Bluetooth pairing procedure. At this time, the in-vehicle head unit enters a phone mode to attempt to pair with a pre-designated or pre-registered user device, e.g. a driver's smartphone (S101 and S103). In addition, a predetermined user interface screen shows that connection to a specific device is attempted and displayed on a display screen of the in-vehicle head unit.

When the pairing procedure automatically performed after starting of the vehicle is canceled by the user, the in-vehicle head unit may sequentially enter a setup menu and a phone menu and displays a predetermined user interface screen including a menu for registering a new user device or selecting one of the pre-registered user devices. The predetermined user interface screen will hereinafter be referred to as a "device registration selection screen" for the convenience of description (S105 to 109). At this time, the user may designate a user device for pairing according to a menu selection on the device registration selection screen. In addition, a predetermined guide message indicating enablement of a Bluetooth function of the user device for pairing may be displayed on the display screen of the in-vehicle head unit.

Referring to reference numeral 1b, the Bluetooth function may be enabled according to a guide message displayed on a screen of the user device (S111).

When the Bluetooth function of the user device is enabled by the user, the user device may search for surrounding devices that are capable of performing Bluetooth pairing and display the search result on the screen (S113).

When the user selects a vehicle based on the search result, the user device transmits a connection request signal to the selected vehicle (S115). At this time, a predetermined passkey input screen for inputting a passkey value corresponding to the selected vehicle may be displayed on the screen of the user device.

Upon receiving the connection request signal from the user device, the in-vehicle head unit may display vehicle information and the passkey value on the screen.

When the passkey value is input to the passkey input screen, the user device transmits the passkey value to the in-vehicle head unit. Determining that the received passkey value is identical to a passkey value of the in-vehicle head unit, the in-vehicle head unit may transmit a predetermined approval completion message indicating that the connection request has been approved to the user device (S117).

FIG. 2 is a view illustrating a user interface screen output to the in-vehicle head unit during the conventional Bluetooth pairing procedure.

Referring to FIG. 2, when the user starts the vehicle and an automatic pairing procedure is commenced, the in-vehicle head unit may output an automatic connection screen informing that Bluetooth connection to a specific user device is being performed (S201).

At this time, when the user clicks a cancel button 200 on the automatic connection screen to cancel the automatic fairing, the in-vehicle head unit may display a screen for registering or selecting a device for pairing (S203 and S205).

Subsequently, when the device for pairing is designated by the user, the in-vehicle head unit may display a predetermined Bluetooth connection guide message indicating the enablement of a Bluetooth function of the designated device on the screen (S207).

At this time, the user may enable the Bluetooth function of the designated device according to the Bluetooth connection guide message.

Subsequently, when the user clicks an OK button 210, the in-vehicle head unit displays a vehicle name and a passkey value to be used to register a new device on the screen and enters a pairing standby state (S209). When a cancel button 220 is selected in the pairing standby state, the in-vehicle head unit may finish the pairing procedure.

In another example, a conventional in-vehicle Bluetooth pairing method using a pairing application may be used.

The user may download a pairing application from an internet market and install the pairing application in the user device. Most of the pairing procedure is identical to the in-vehicle Bluetooth pairing procedure shown in FIGS. 1 and 2 except when the pairing application is driven, devices registered by the pairing application and available devices, such as a vehicle, a Bluetooth headset, a smartphone, and a mobile phone, are searched and the user may select and add the available devices to a registered device list.

In the in-vehicle Bluetooth pairing method using the pairing application, however, the pairing application must be downloaded and installed in the user device. Furthermore, the pairing application may not be compatible with all devices. For example, a specific pairing application may be operated only in devices based on an Android operation system. In addition, the number of the user manipulation steps for pairing in the in-vehicle head unit is not reduced although the pairing application is used.

When the vehicle driver wishes to perform Bluetooth pairing with a new user device after starting of the vehicle as described above, it is necessary to sequentially perform the step of entering the phone mode on the in-vehicle head unit, the step of canceling the automatic pairing procedure, the step of entering the setup menu, the step of entering the phone menu, and the step of selecting the device for pairing.

FIG. 3 is a view showing a configuration of an in-vehicle hands-free conversation system in which an in-vehicle head unit is connected to a user device according to an embodiment of the present inventive concept.

As shown in FIG. 3, the in-vehicle hands-free conversation system may include a user device 20 and an in-vehicle head unit 10.

The in-vehicle head unit 10 may include a Bluetooth module 310, an in-vehicle communication module 320, a signal detection module 330, a memory 340, an input key module 350, an output 360, an audio/video (A/V) input 370, a controller 380, and a power supply unit 390.

The in-vehicle head unit 10 may be interlocked with a global positioning system (GPS) module equipped in one side of the vehicle to acquire information regarding current location of the vehicle. The acquired location information may be used as information for selecting a dummy voice recognition database, which will hereinafter be described. Selection of a dummy voice recognition database based on the location of the vehicle according to an embodiment of the present inventive concept will be more apparent from the following description.

The Bluetooth module 310 may include a baseband module for processing a baseband signal according to a Bluetooth standard, a power amplifier for amplifying the baseband signal, a band pass filter (BPF) for converting the amplified baseband signal into a transmission frequency band or passing a signal having a desired frequency band selected from among radio frequency (RF) signals received through an antenna, a low noise amplifier (LNA) for amplifying the band-passed RF signal to be easily recognized and transmitting the RF signal to the baseband module, and an antenna for transmitting and receiving the RF signal.

In addition, the Bluetooth module 310 may perform Bluetooth communication with the user device 20, a Bluetooth function of which has been enabled, through a control procedure. For example, the Bluetooth module 310 may transmit a Bluetooth connection request signal to the user device 20 and receive an approval signal for the Bluetooth connection request from the user device 20. When approval is completed, the Bluetooth module 310 may receive phone book information stored in the user device 20 and store the phone book information in the memory 340.

The in-vehicle communication module 320 communicates with an electronic control unit (ECU, not shown) of the vehicle. For example, when the vehicle starts, the in-vehicle communication module 320 may receive a control signal indicating ACC ON from the ECU that senses starting of the vehicle and transmits the control signal to the controller 380. The controller 380 may apply power to the in-vehicle head unit and commence an automatic pairing procedure.

The signal detection module 330 may detect a received signal strength indicator (RSSI) received from an external device and measures strength of the detected signal. In addition, the signal detection module 330 may select and sort an external user device 20 that can be paired based on the strength of the detected signal and transmit the signal to the controller 380. At this time, the signal detection module 330 may transmit an RSSI read command to a link management protocol (LMP) layer, which is a protocol layer that performs link setup between Bluetooth devices, of the Bluetooth module 310 to acquire an RSSI value of a signal received from the user device 20. At this time, the RSSI value may be detected only when a discoverable mode of the user device 20 is enabled. The discoverable mode may be set through a selection of a predetermined menu of the user device 20.

The memory 340 may store programs for operating the controller 380 and lower modules controlled by the controller 380 and temporarily store input/output data (for example, phone book information, messages, still images, videos, and application programs). The application programs may include programs for Bluetooth hands-free communication, navigation, games, chatting, web surfing, schedule management, and multimedia reproduction.

In particular, the memory 340 may retain a voice recognition database necessary for Bluetooth hands-free communication.

The voice recognition database may be classified into an existing voice recognition database, a new voice recognition database, or a dummy voice recognition database.

The existing voice recognition database is a voice recognition database created by the in-vehicle head unit 10 based on existing phone book information received from a Bluetooth-accessed user device before download of new phone book information. The existing voice recognition database may be used when the phone book information is being received from the user device 20 or the new phone book information received from the user device 20 is identical to the existing phone book information.

The new voice recognition database is a voice recognition database newly created when the new phone book information received from the user device 20 is different from the existing phone book information. When the new voice recognition database is created, the existing phone book information is deleted from the memory. Subsequently, the in-vehicle head unit 10 may recognize a user's input voice using the new voice recognition database to provide an in-vehicle Bluetooth hands-free communication service, i.e. an outgoing call through voice recognition.

The dummy voice recognition database is a voice recognition database created based on a dummy phone book. The dummy voice recognition database may be used when the existing phone book information is not present in the memory unit 340 or in a state in which the new voice recognition database is being created.

The dummy phone book may contain names which are the most frequently used in a corresponding country or local area. However, it should be noted that the dummy phone book does not contain telephone number information corresponding to the names. That is, the dummy phone book is a phone book used to minimize user inconvenience caused due to a voice recognition error and incorrect voice recognition. Names frequently used in a country/local area in which the user device 20 is registered or a country/local area in which a corresponding vehicle is registered may be created based on pre-collected statistics information.

Conventionally, when a name which is not present in the existing voice recognition database is called in a state in which phone book information is being received from the user device 20 in a Bluetooth hands-free conversation mode, the in-vehicle head unit 10 may incorrectly recognize a user's input voice or continuously output a redialing request message due to a voice recognition error.

When the current phone book is not present or telephone conversation to a name which is not present in the current phone book is requested, the in-vehicle head unit 10 may perform voice recognition using the stored dummy voice recognition database to solve the above problem. As a result, it is possible to minimize an incorrect recognition rate for a user's input voice and, in addition, to minimize user inconvenience due to output of an incorrect guide message.

Generally, in the Bluetooth hands-free conversation mode, an outgoing call command may include a combination of a outgoing call command and a receiver's name. For example, when a user wishes to make a telephone call to James, the user may say "Call James."

In addition, when sensing an outgoing call command of "Call James" in a state in which the existing voice recognition database is not present and new phone book information is being received from the user device 20, the in-vehicle head unit 10 may perform voice recognition for the outgoing call command using the pre-stored dummy voice recognition database. In a case in which the name of James is contained in the dummy voice recognition database, i.e. the voice recognition is performed through the dummy voice recognition database, the in-vehicle head unit 10 may output a correct guide message of "There is no phone book and voice recognition is impossible. Please download telephone numbers in the vehicle." The guide message may be output through a voice or a popup notification message.

In addition, the memory 340 may retain a dummy voice recognition database pre-created based on a country or local area. In this case, the in-vehicle head unit 10 may be interlocked with a global positioning system (GPS) module equipped in the vehicle to recognize a country or local area in which the vehicle is currently located and performs voice recognition using the dummy voice recognition database corresponding to the recognized country or local area. For example, in a case in which the vehicle is located in South Korea, names frequently used in South Korea may be contained in dummy phone book information. In a case in which the vehicle is located in U.S.A., on the other hand, names frequently used in U.S.A. may be contained in the dummy phone book information. At this time, the names frequently used per country or local area may be decided based on statistics information pre-collected based on a country or local area.

In addition, the memory 340 may store data on various vibration and sound patterns output at the time of touch input on a touchscreen.

The memory 340 may include at least one selected from among a flash memory, a hard disk memory, a multimedia card micro memory, a card memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The input key module 350 generates input data for controlling operation of the in-vehicle head unit 10. The input key module 350 may include a key pad, a dome switch, a touch pad (static pressure/electrostatic), a jog wheel, and a jog switch.

The output 360 generates an output relevant to a sense of sight, hearing, or touch. The output 360 may include a display module 361, a sound output module 352, and an alarm module 363.

The display module 361 displays or outputs information processed by the in-vehicle head unit 10. For example, when the in-vehicle head unit 10 is in a Bluetooth hands-free conversation mode, the display module 361 displays a user interface (UI), or graphical user interface (GUI) related to the Bluetooth hands-free conversation mode. On the other hand, when the in-vehicle head unit 10 is in a navigation mode, the display module 361 displays a user interface (UI) or graphical user interface (GUI) related to travel guidance.

The display module 361 may include at least one selected from among a liquid crystal display, a thin film transistor-liquid crystal display, an organic light-emitting diode, a flexible display, and a three-dimensional (3D) display.

According to configuration of the in-vehicle head unit 10, two or more display modules 361 may be provided. For example, the display modules 361 may be disposed at one side of the in-vehicle head unit 10 separately or integrally. Alternatively, the display modules 361 may be disposed at opposite sides of the in-vehicle head unit 10.

In a case in which the display module 361 and a sensor for sensing a touch (hereinafter, referred to as a "touch sensor") constitute a mutual layer structure (hereinafter, simply referred to as a "touchscreen"), the display module 361 may be used as an input device in addition to an output device.

The touch sensor may be configured as a touch film, a touch sheet, or a touchpad.

The touch sensor may be configured to convert pressure applied to a specific portion of the display module 361 or change of capacitance generated from a specific portion of the display module 361 to an electric input signal. The touch sensor may be configured to sense pressure of a touch as well as a touched position or area.

When a touch input is made to the touch sensor, a signal(s) corresponding to the touch is transmitted to a touch controller. The touch controller processes the signal(s) and then transmits data corresponding to the processed signal(s) to the controller 380. Therefore, the controller 380 may recognize which portion of the display module 361 has been touched.

The sound output module 362 may output audio data received through the Bluetooth module 310 or stored in the memory 340 in a Bluetooth hands-free conversation mode, a Bluetooth pairing mode, a sound/video reproduction mode, and a navigation mode. In addition, the sound output module 362 may output a sound effect signal related to a function (e.g. a call signal reception sound, a message reception sound, or a pairing completion sound) performed by the in-vehicle head unit 10. The sound output module 362 may include a receiver, a speaker, and a buzzer. In addition, the sound output module 362 may output sound through an earphone jack provided at one side of the in-vehicle head unit 10.

The alarm module 363 outputs signals for notifying that events have been generated in the in-vehicle head unit 10. Examples of events generated in the in-vehicle head unit 10 may include call signal reception, message reception, key signal input, touch input, and reception of vehicle state information from the in-vehicle communication module 320. The vehicle state information may include door opening information, engine overheating information, lane deviation information, and fuel state information. The alarm module 363 may output other signals, such as vibration signals for notifying of event generation, in addition to video signals or audio signals. The video signals or the audio signals may also be output through the display module 361 or the sound output module 362.

The A/V input 370 is provided to input audio signals or video signals. The A/V input 370 may include a camera 371 and a microphone 372.

The camera 371 processes image frames, such as still images or videos, acquired by an image sensor in a video conversation mode or in a capturing mode. The processed image frames may be displayed on the display module 361. In addition, the camera 371 may capture images behind the vehicle when the vehicle is moved backward. The captured images may be output through the display module 361.

The image frames processed by the camera 371 may be stored in the memory 340 or transmitted to a paired user device 20 via the Bluetooth module 310.

According to configuration of the in-vehicle head unit 10 and the vehicle, two or more cameras 371 may be provided.

The microphone 372 may receive external sound signals and convert the received sound signals into electrical voice data in a telephone conversation mode, a recording mode, or a voice recognition mode. In the telephone conversation mode, the converted voice data may be transmitted to the paired user device 20 through the Bluetooth module 310.

In the voice recognition mode, the microphone 372 may transmit the converted voice data to the controller 380. The controller 380 may perform voice recognition for the received voice data using the stored voice recognition database. The controller 380 may be implemented with one or more microprocessors executed by a program stored in a non-transitory computer-readable medium. The program may include a series of commands for performing each step included in a method of controlling an outgoing call in a vehicle equipped with a voice recognition function according to an exemplary embodiment of the present inventive concept.

The power supply 390 supplies power necessary to operate the in-vehicle head unit 10. When the vehicle is powered ON, the power supply 390 may automatically supply power to the in-vehicle head unit 10. When the vehicle is powered OFF, the power supply 390 may automatically interrupt the supply of power to the in-vehicle head unit 10.

The controller 380 generally controls overall operation of the in-vehicle head unit 10.

For example, the controller 380 may control a communication function including hands-free conversation using Bluetooth pairing, data communication, and video communication. In addition, the controller 380 may control an application program to be installed and driven.

In addition, the controller 380 may perform pattern recognition processing that is capable of recognizing a writing input or a drawing input performed on the touchscreen as text and images.

Furthermore, when the vehicle system is prepared and Bluetooth pairing with the user device 20 is completed, the controller 380 may identify the user device 20. In a case in which the existing voice recognition database corresponding to the identified user device 20 is present in the memory 340, the controller may perform voice recognition using the existing voice recognition database until a new voice recognition database corresponding to the identified user device 20 is created.

In addition, the controller 380 may compare phone book information received from the user device 20 with the existing phone book information. Upon determining that the phone book information received from the user device 20 is not identical to the existing phone book information, the controller 380 may create a new voice recognition database using the newly received phone book information. Subsequently, the existing voice recognition database may be replaced by the new voice recognition database, which may be retained in the memory 340.

Upon determining that the phone book information received from the user device 20 is identical to the existing phone book information, the controller 380 may perform voice recognition using the existing voice recognition database without creating the new voice recognition database.

In a case in which a new phone book is downloaded from the user device 20 in a state in which the existing voice recognition database is not present, the controller 380 may perform voice recognition using the stored dummy voice recognition database.

The number of names contained in the dummy phone book may be limited to a defined number in consideration of a voice recognition response time, i.e. such that a defined voice recognition response time is not exceeded. A voice recognition rate based on the number of names contained in the dummy phone book will be described in detail with the accompanying drawings.

In addition, the controller 380 may dynamically adjust a confidence value used by a voice recognition engine equipped in the in-vehicle head unit 10, which will hereinafter be simply referred to as a voice recognition engine confidence value, based on the number of names contained in the dummy phone book and a required voice recognition rate.

In general, as the number of names contained in the dummy phone book increases, the voice recognition rate is increased but a voice recognition response time may also be increased. For this reason, the controller 380 may adjust the voice recognition engine confidence value based on the number of names contained in the dummy phone book and the size of the dummy phone book such that the voice recognition engine confidence value corresponds to the voice recognition rate.

For example, when comparing a case in which the number of names contained in the dummy phone book is 200 and the voice recognition rate is 90%, and a case in which the number of names contained in the dummy phone book is 1000 and the voice recognition rate is 90%, the voice recognition engine confidence value of the former may be set such that the voice recognition engine confidence value of the former is lower than that of the latter.

When the voice recognition engine confidence value is set to low even in a case in which a name of James is not contained in the dummy phone book, the controller 380 may perform voice recognition for similar names, such as Jane and Jay. Consequently, it is not necessary for the user to reissue a voice command or to check an incorrect guide message.

In particular, the controller 380 may control input and output operations according to various control signals received from the lower modules and provide a user interface screen based thereupon. The lower modules may include the Bluetooth module 310, the in-vehicle communication module 320, the signal detection module 330, the memory 340, the input key module 350, the output 360, the A/v input 370, and the power supply 390 as previously described.

For example, in a case in which a user's voice input for a hands-free outgoing call is recognized using the dummy voice recognition database, the controller 380 may output a predetermined notification message indicating that available phone book information is not present in the in-vehicle head unit to be output.

The notification message may be output to the display module 361 through a popup notification window. Alternatively, the notification message may be output in the form of a voice guide message through the sound output module 362.

Figure 4:
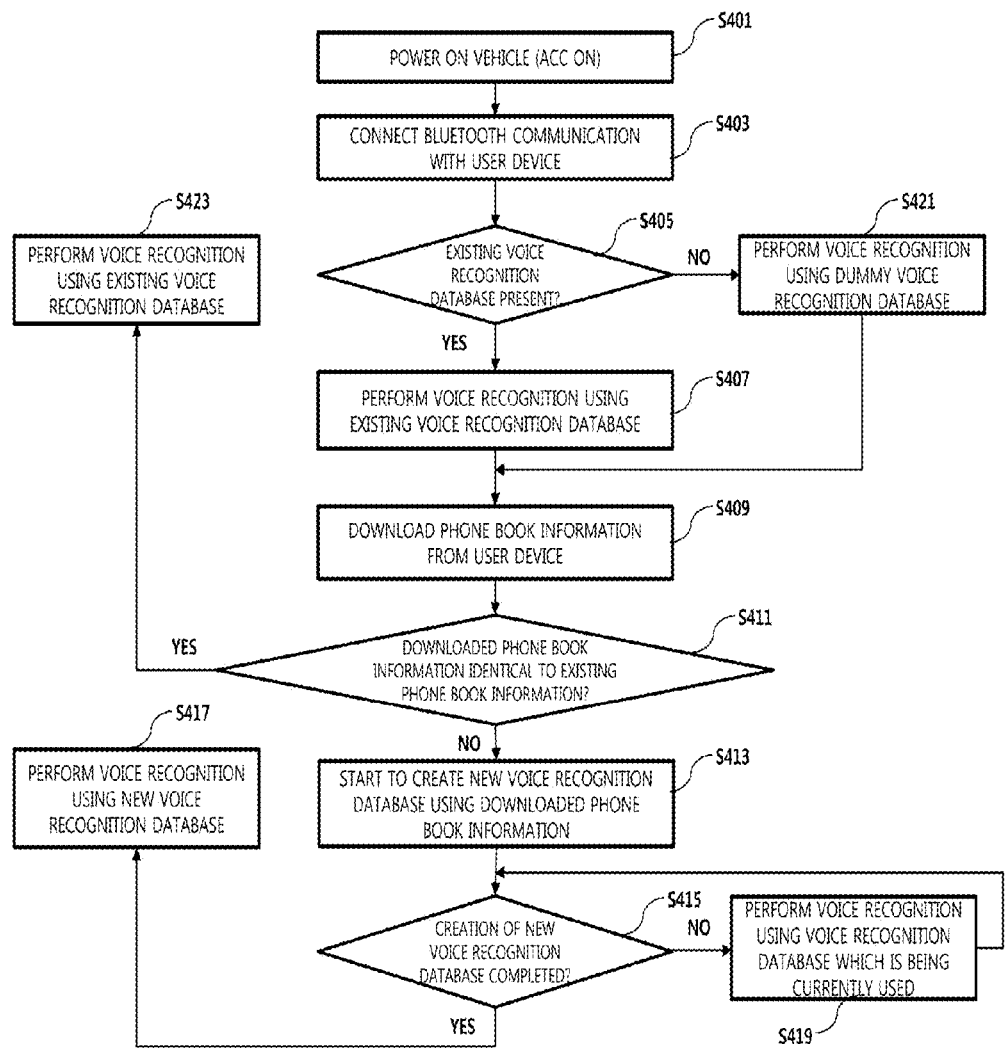
FIG. 4 is a flowchart illustrating an outgoing call control method using voice recognition according to an embodiment of the present inventive concept.

FIG. 4 is a flowchart illustrating an outgoing call control method using voice recognition according to an embodiment of the present invention.

Referring to FIG. 4, when the vehicle is powered on (S401) and Bluetooth communication connection with the user device 20 is completed (S403), the in-vehicle head unit 10 checks whether an existing voice recognition database is present (S405).

Upon checking that the existing voice recognition database is present, the in-vehicle head unit 10 performs voice recognition using the existing voice recognition database (S407).

Subsequently, the in-vehicle head unit 10 downloads phone book information from the user device 20 through a connected Bluetooth communication channel (S409).

When download of the phone book information is completed, the in-vehicle head unit 10 determines whether the downloaded phone book information is identical to the existing phone book information (S411).

Upon determining that the downloaded phone book information is not identical to the existing phone book information, the in-vehicle head unit 10 starts to create a new voice recognition database using the downloaded phone book information (S413).

Subsequently, the in-vehicle head unit 10 checks whether creation of the new voice recognition database has been completed (S415). Based on the checking result, the in-vehicle head unit 10 may perform voice recognition using the new voice recognition database (S417) or the voice recognition database which is being currently used (S419).

Upon checking at step S405 that the existing voice recognition database is not present, the in-vehicle head unit 10 may perform voice recognition using a pre-created dummy voice recognition database (S421). Subsequently, the in-vehicle head unit 10 starts to download phone book information from the user device 20.

Upon determining at step S411 that the downloaded phone book information is identical to the existing phone book information, the in-vehicle head unit 10 may perform voice recognition using the existing voice recognition database without creating a new voice recognition database (S423).

Figure 5:
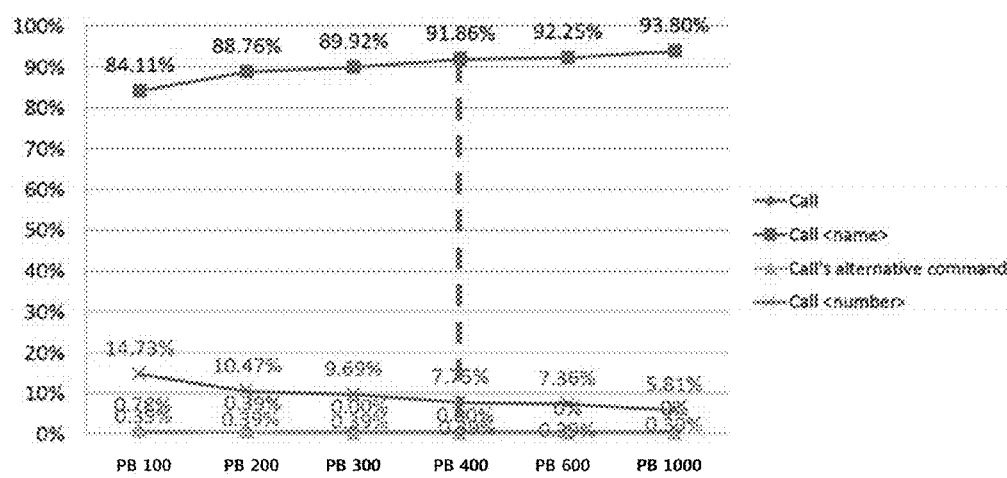
FIG. 5 is a view showing a simulation result that reveals change of a voice recognition rate based on the size of a dummy phone book according to an embodiment of the present inventive concept.

FIG. 5 is a view showing a simulation result that reveals change of a voice recognition rate based on the size of a dummy phone book according to an embodiment of the present inventive concept.

The experimental result shown in FIG. 5 reveals change of a voice recognition rate based on change in the number of names contained in a dummy phone book per voice command type.

Here, 1000 names frequently used in North America were used as the names contained in the dummy phone book.

The voice command types used in this experiment include Call, Call+Name, Call's alternative command, and Call+Number.

Referring to FIG. 5, it can be seen that, in a case in which the voice command type is Call+Name, the voice recognition rate is increased as the number of names contained in the dummy phone book is increased. For example, the voice recognition rate is 84.11% in a case in which the number of names contained in the dummy phone book is 100, and the voice recognition rate is 91.86% in a case in which the number of names contained in the dummy phone book is 400. In a case in which the number of names contained in the dummy phone book is 100, on the other hand, the voice recognition rate is 93.80%, which is not greatly different from the voice recognition rate in a case in which the number of names contained in the dummy phone book is 400. Generally, it may be determined that the voice recognition rate is excellent when the voice recognition rate is 90% or more. Consequently, it may be suitable that the number of names contained in the dummy phone book is about 400 in consideration of a voice recognition response time.

On the other hand, it can be seen that, in a case in which the voice command type is Call+Number (telephone number), the voice recognition rate decreases as the number of names contained in the dummy phone book increases.

As is apparent from the above description, the method and apparatus according to the present disclosure have the following effects.

First, the present disclosure has an advantage of providing an outgoing call control method for an in-vehicle head unit that is capable of performing voice recognition based on an existing voice recognition database in a case in which phone book information received from a Bluetooth-paired mobile device is not present or while a phone book and a call history are received through Bluetooth pairing, thereby preventing generation of an incorrect guide message and malfunction.

Second, the present disclosure has an advantage of providing an outgoing call control method for an in-vehicle head unit that is capable of performing voice recognition based on an existing voice recognition database even during creation of a new voice recognition database based on phone book information received from a mobile device, thereby preventing generation of an incorrect guide message and malfunction.

Third, the present disclosure has an advantage of providing an outgoing call control method for an in-vehicle head unit that is capable of using a stored dummy voice recognition database in an interlocked state in a case in which an existing voice recognition database is not present during download of a phone book, thereby preventing repeated generation of a voice recognition error.

Fourth, the present disclosure has an advantage of providing an outgoing call control method for an in-vehicle head unit that is capable of displaying a correct guide message even when a call-related command contained in a dummy database is input.

It will be appreciated by persons skilled in the art that the effects that can be achieved through the present disclosure are not limited to what has been particularly described hereinabove and other advantages of the present disclosure will be more clearly understood from the above detailed description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An outgoing call control method for an in-vehicle head unit equipped with a voice recognition function, the method comprising steps of:
   connecting Bluetooth communication with a user device when a vehicle is powered on;
   checking whether an existing voice recognition database is present;
   downloading phone book information from the user device through the connected Bluetooth communication;
   performing the voice recognition for the outgoing call after the step of checking the existing voice recognition database using a dummy voice recognition database if the existing voice recognition database is not present; and
   performing the voice recognition for the outgoing call using the existing voice recognition database during download of the phone book information if the existing voice recognition database is present.

2. The outgoing call control method according to claim 1, wherein a notification message indicating that available phone book information is not present in the in-vehicle head unit is output when a user's input voice is recognized using the dummy voice recognition database.

3. The outgoing call control method according to claim 2, wherein the notification message is output using at least one selected from a popup notification window and a voice.

4. The outgoing call control method according to claim 1, wherein the dummy voice recognition database is created using dummy phone book information comprising frequently used names, and a dummy phone book does not contain telephone number information corresponding to the names.

5. The outgoing call control method according to claim 4, wherein the number of the names contained in the dummy voice recognition database is based on a voice recognition rate.

6. The outgoing call control method according to claim 5, wherein a confidence value used by a voice recognition engine of the in-vehicle head unit is adjusted based on the number of the names and the voice recognition rate.

7. The outgoing call control method according to claim 4, wherein the number of the names contained in the dummy voice recognition database is based on a voice recognition response time.

8. The outgoing call control method according to claim 1, wherein the dummy voice recognition database is retained based on dummy phone book information based on a country or local area.

9. The outgoing call control method according to claim 8, wherein the in-vehicle head unit is interlocked with an in-vehicle global positioning system (GPS) module and the dummy voice recognition database corresponding to a current location of the in-vehicle head unit is used in the voice recognition for the outgoing call.

* * * * *